US012614943B2

(12) United States Patent
Huber et al.

(10) Patent No.: US 12,614,943 B2
(45) Date of Patent: Apr. 28, 2026

(54) ELECTRICAL OPERATING MEANS HAVING AN INSULATION SYSTEM, AND METHOD FOR PRODUCING THE INSULATION SYSTEM

(71) Applicant: Siemens Aktiengesellschaft, Munich (DE)

(72) Inventors: Jürgen Huber, Erlangen (DE); Steffen Lang, Hallerndorf (DE); Niels Müller, Nuremberg (DE); Matthias Übler, Ursensollen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1181 days.

(21) Appl. No.: 17/291,514

(22) PCT Filed: Oct. 10, 2019

(86) PCT No.: PCT/EP2019/077469
§ 371 (c)(1),
(2) Date: May 5, 2021

(87) PCT Pub. No.: WO2020/094328
PCT Pub. Date: May 14, 2020

(65) Prior Publication Data
US 2022/0029491 A1    Jan. 27, 2022

(30) Foreign Application Priority Data
Nov. 6, 2018    (DE) ..................... 10 2018 218 866.1

(51) Int. Cl.
*H02K 3/30*        (2006.01)
*B32B 27/04*       (2006.01)
*C08K 3/013*       (2018.01)
*C08L 63/00*       (2006.01)

(52) U.S. Cl.
CPC .............. *H02K 3/30* (2013.01); *B32B 27/04* (2013.01); *C08K 3/013* (2018.01); *C08L 63/00* (2013.01)

(58) Field of Classification Search
CPC .......... H02K 3/30; B32B 27/04; C08K 3/013; C08L 63/00
See application file for complete search history.

(56) References Cited

U.S. PATENT DOCUMENTS

| | | | | |
|---|---|---|---|---|
| 5,102,960 A | * | 4/1992 | Imai ........................ | C08L 83/10 |
| | | | | 525/487 |
| 6,103,157 A | | 8/2000 | Behm et al. .................. | 264/102 |
| 6,437,090 B1 | | 8/2002 | Murai et al. .................. | 528/416 |
| 6,555,601 B1 | | 4/2003 | Behm et al. .................. | 523/435 |
| 2014/0378625 A1 | | 12/2014 | Xiu et al. ...................... | 525/476 |
| 2016/0035638 A1 | * | 2/2016 | Akiba ..................... | B32B 5/024 |
| | | | | 428/447 |
| 2017/0047142 A1 | * | 2/2017 | Disson ............... | C08G 59/4238 |
| 2020/0195077 A1 | | 6/2020 | Mashkin et al. | |

FOREIGN PATENT DOCUMENTS

| | | | | |
|---|---|---|---|---|
| CN | 1215902 A | 5/1999 | ............. | B29C 43/18 |
| CN | 104144964 A | 11/2014 | ............. | C08G 59/42 |
| EP | 0 889 484 | 1/1999 | ............. | H01B 3/40 |
| EP | 1 354 916 | 10/2003 | ............. | C08L 63/02 |
| EP | 1981150 A2 | 10/2008 | ............. | H02K 3/50 |
| EP | 3385957 A1 | 10/2018 | ............. | H01B 3/04 |
| JP | 63168427 A | 7/1988 | ............. | C08G 59/00 |

OTHER PUBLICATIONS

Search Report for International Application No. PCT/EP2019/077469, 10 pages, Jan. 22, 2020.
German Office Action, Application No. 102018218866.1, 6 pages, Jun. 14, 2019.
Li, Ziqiang, et al., "Effect of Anhydride Amount on the Resistivity and Compressive Strength of Epoxy Resin Pouring Sealant," Guangzhou Chemical Industry, vol. 39, No. 11, College of Materials and Chemical & Chemistry Engineering, Chengdu University of Technology, 5 pages, 2011.
Chinese Office Action, Application No. 201980073039.7, 7 pages, Nov. 25, 2022.
Dejun, Zeng et al., "Q&A on New Equipment and New Technology of Distribution Network," Shanghai Electric Power Company, China Electric Power Press, 7 pages (Chinese w/ English translation), Jan. 2001.
Li, Jianming et al., "Urban Rail Transit Power Supply," Southwest Jiaotong University Press, 9 pages (Chinese w/ English translation), Sep. 2007.

* cited by examiner

*Primary Examiner* — Callie E Shosho
*Assistant Examiner* — Bethany M Miller
(74) *Attorney, Agent, or Firm* — Slayden Grubert Beard PLLC

(57) ABSTRACT
Various embodiments include an electrical operating medium having an insulation system comprising a main insulation in the form of an encapsulation by an encapsulating compound. The encapsulating compound comprises the following components:
a carbon-based resin component A; a silicon/oxygen-based resin component B; where the ratio of the components A:B is in the range between A=99:B=1 to A=60:B=40; 0.1% to 10% by weight of catalyst; 30% to 85% by weight of dielectric filler; and 0-60% by weight of a curing agent.

13 Claims, No Drawings

ELECTRICAL OPERATING MEANS HAVING AN INSULATION SYSTEM, AND METHOD FOR PRODUCING THE INSULATION SYSTEM

CROSS-REFERENCE TO RELATED APPLICATIONS

This application is a U.S. National Stage Application of International Application No. PCT/EP2019/077469 filed Oct. 10, 2019, which designates the United States of America, and claims priority to DE Application No. 10 2018 218 866.1 filed Nov. 6, 2018, the contents of which are hereby incorporated by reference in their entirety.

TECHNICAL FIELD

The present disclosure relates to an electrical operating medium having high electrical rated voltage having at least one voltage-bearing conductor bar with an insulation system.

BACKGROUND

Examples of electrical equipment are especially rotating electrical machines, such as electrical generators, electric motors, but also transformers, choke coils, electrical switches and bushings. Generation of electrical energy is typically accomplished using rotating high-voltage machines in the form of generators. EP 1 981 150 A2 describes a generator having a rotatable rotor and a stator disposed around the rotor. The stator has a laminated core in a rotationally symmetric configuration, with electrically conductive stator winding bars running in the grooves of the laminated core. The laminated core is adjoined on either side by a winding head that connects the winding bars via connecting elements to give a complete winding.

In the operation of high-voltage machines over and above 1 kV with powers exceeding 5 MVA, rated voltages exceeding 5-10 kV can be attained. The components are accordingly exposed to high mechanical, thermal, and electrical stresses. The reliability of the insulation system of the electrical conductors, for example of the voltage-bearing conductor bar, is therefore responsible to a crucial degree for operational reliability. One example of such an insulation system is the main insulation of generators. This ensures the shielding of the copper conductors that are under high voltage with respect to the grounded stator.

It conventionally consists of plastic-impregnated mica tapes and has a high electrical lifetime, which enables it to sustainably dissipate 3.5 kV per millimeter. This insulation system generally comprises an insulation between conductor elements, called the conductor element insulation, and between the conductors or winding bars and the laminated core in the groove region, the main insulation.

The fundamental problem with such allegedly stressed insulation system lies in partial discharge-induced erosion with development of "treeing" channels that ultimately lead to electrical breakdown of the insulation. Typically, mica-based installations are used for sustained insulation of the voltage-bearing conductors in rotating machines.

The main insulation is formed by winding tapes around preformed coils produced from insulated conductor elements—called the winding tape insulation—and then impregnating with a resin in a vacuum pressure impregnation (VPI) process. Winding tapes are used here in the form of mica paper, which are wound in a non-automated or not entirely automated manner, but partly still by hand, around the conductor. The production of an insulation system therefore takes a correspondingly long period of time, nowadays around 36 hours for a generator bar.

In the VPI process, the impregnation fills the cavities present in the winding tape between the individual particles and/or tape folds with the impregnating resin. The composite of impregnating resin and mica paper is cured and forms the insulation material which is then processed in the insulation system and provides the mechanical strength of the insulation system. The VPI process fills even the smallest cavities in the winding tape insulation with resin, in order to minimize the number of internal gas-solid interfaces.

Overall, this places extremely high electrical, thermal, and mechanical demands on the insulation of the conductors of a winding from one another, the winding from the insulated core, and also the sliding arrangement at the exit of the conductors from the laminated core. In machine insulation, a distinction is made between internal potential control between the copper conductor assembly and the main voltage insulation, outer corona shield between the main insulation and laminated core, and terminal corona shield at the exit of the winding bars from the laminated core.

A conventional insulation system of a rotating electrical machine, comprising an impregnated winding composed of mica tape with tape adhesive and tape accelerator, a base resin, for example an epoxy resin, with one or more curing agents, optionally including epoxy-functionalized curing agents, has a thickness in the range from 0.5 mm to 1 cm. The thickness of the insulation systems of other electrical operating media may also be significantly more, for example up to 25 cm in the case of bushings. During the operation of the electrically rotating machine, electrical discharges arise over the course of time, which in turn attack the plastic in the insulation.

The plastic here is locally destroyed, resulting in electrical erosion phenomena. This destruction of the insulation system is delayed by the partial discharge-resistant mica in platelet form in the winding tape of the insulation system through lengthening of the erosion pathway, such that a minimum lifetime of 25 years can be assured. Nevertheless, an erosion pathway through the insulation system forms gradually over the course of the lifetime, ultimately resulting in a ground fault in the electrically rotating machine. If—in the course of further technical development—the electrical field strength were to be raised from 3.5 kV/mm to 4.5 kV/mm, for example, the electrical erosion pathway would be formed earlier and would lead to a ground fault and hence to total failure, for example, after as early as 5 years.

The chosen thickness of the insulation system here should be as low as possible in order to achieve high efficiencies of the machines. In order to increase the performance density in the electrical operating medium, for example a generator and/or electric motor, efforts are made to reduce the thickness of the insulation system, for example by about 20%. It automatically leads to rising electrical field strengths in the insulation system from—again by way of example—3.5 kV/mm to 4.5 kV/mm, and hence to elevated electrical partial discharge activity. The conventionally used insulation systems permit sustained operating field strengths of 3.5 kV/mm for a technically possible lifetime of at least 25 years.

Base resins used to date for electrical insulation systems and especially also as impregnating resins for winding tape insulations are often carbon-based epoxy resins which, in liquid form, bear all possible functional groups, for example including epoxy groups, on a carbon-based $(-CR_2-)_n$ backbone. These are included in the reaction of a resin-curing agent mixture to give a thermoset that forms the impregnation of the winding tape insulation.

There are planar, partial discharge-resistant mica platelets in the winding tape, which are arranged like scales around the copper conductor through the mica tape, in order thus to lengthen the erosion pathway. At the same time, the mica tape includes a catalyst, which is required in order to partly gelate the resin-curing agent mixture, based, for example, on epoxide-anhydride chemistry, in the mica tape during impregnation thereof, in order that the resin can no longer flow away. After the impregnation process, the resin is cured. In the course of impregnation, for example, a generator bar is flooded completely with resin, but only in the regions in which the catalyst is present is the impregnating resin partly gelated and no longer able to flow away. In the remaining regions, the impregnating resin can flow away again at impregnation and is stored in tanks. For that reason, the resin-curing agent mixture must have good storage stability and/or a long pot life for the resin-curing agent mixture not to cure in the storage tanks even without catalyst in the mica tape.

EP 17192058 describes a siloxane-containing resin or resin-curing agent mixture leading to incorporation of siloxane groups into the backbone of the polymer chain or of the polymer network of the cured resin, and hence increases the lifetime of the insulation system to a crucial degree. Or in other words, the thickness of the insulation system, for the same lifetime, could be reduced with the resin-curing agent mixture described in EP 17192058, which results in a higher power density. Unfortunately, siloxanes have free hydroxyl groups as a result of the preparation, which distinctly reduce the storage stability of the resin-curing agent mixture, and so commercial utilization of the insulation system extended by siloxane units with the existing production processes brings economic disadvantages.

SUMMARY

The teachings of the present disclosure include resin-containing insulation systems for an electrical operating medium, in which "—$SiR_2$—O—" units are detectable in the polymer chain, or the polymer network, in the encapsulation, the cured encapsulating compound and/or processes for producing a main insulation or part of a main insulation of such an insulation system, which can be run in an economically viable manner, sufficient for the storage stability of a silicone- and/or siloxane-containing encapsulation and/or resin-curing agent mixture.

For example, some embodiments include an electrical operating medium having an insulation system comprising a main insulation in the form of an encapsulation by an encapsulating compound, characterized in that the encapsulating compound comprises the following components: A) a first resin component A which is carbon-based, B) a second resin component B which is silicon/oxygen-based, where the ratio of the first to the second resin component A:B is in the range between A=99:B=1 to A=60:B=40, i.e. the first resin component is in a predominant amount, C) 0.1% to 10% by weight of catalyst, D) 30% to 85% by weight of dielectric, especially mineral, filler, and E) 0-60% by weight of a curing agent.

In some embodiments, "R" in the —$CR_2$— units of the resin component A and/or the resin component B has the following definition: "R" represents saturated and unsaturated radical, and "R"=aryl, alkyl, alkoxy-, alkenyl-, alkynyl-, heterocycle-containing radicals, also including nitrogen-, amine-, carboxyl-, oxygen- and/or sulfur-substituted aryls and/or alkyls, and any combinations of two or more of the radicals mentioned in one radical.

In some embodiments, "R" in the —$CR_2$— units is the same or different and in the resin component A and/or the resin component B represents the following groups: alkyl, for example methyl, propyl, isopropyl, butyl, isobutyl, tert-butyl, pentyl, isopentyl, cyclopentyl and all other analogs up to dodecyl, i.e. the homolog having 12 carbon atoms; alkenyl, vinyl, styrene; aryl, for example: benzyl, benzoyl, biphenyl, tolyl, xylenes etc., especially, for example, all aryl radicals whose structure conforms to Hückel's definition of aromaticity, heterocycles: especially sulfur-containing heterocycles such as thiophene, tetrahydrothiophene, 1,4-thioxane and homologs and/or derivatives thereof, oxygen-containing heterocycles, for example dioxane, nitrogen-containing heterocycles, for example —CN, —CNO, —CNS, —N3 (azide) etc., sulfur-substituted aryls and/or alkyls: e.g. thiophenes, but also thiols, and radicals of what are called "unsaturated polyester resins" "UP", which can react via one or more double bonds in the molecule to give thermosets.

In some embodiments, the resin component A is selected from the group of the following resins: epoxy resins, in general, bisphenol F diglycidyl ether (BFDGE), bisphenol A diglycidyl ether (BADGE), polyurethane and mixtures thereof, undistilled and/or distilled, bisphenol A diglycidyl ether, undistilled and/or distilled, bisphenol F diglycidyl ether, hydrogenated bisphenol A diglycidyl ether and/or hydrogenated bisphenol F diglycidyl ether, pure and/or solvent-diluted epoxy novolak and/or epoxy-phenol novolak, cycloaliphatic epoxy resins, 3,4-epoxycyclohexyl-methyl 3,4-epoxycyclohexylcarboxylate; bis(3,4-epoxycyclohexylmethyl) adipate, vinylcyclohexene diepoxide, 2-(3, 4-epoxycyclohexyl-5,5-spiro-3,4-epoxy)-cyclohexane-meta-dioxane, diglycidyl hexahydrophthalate, tetrahydrophthalic acid diglycidyl ether; glycidated amino resins (N,N-diglycidyl-para-glycidyloxyaniline, N,N-diglycidyl-meta-glycidyloxyaniline, N,N,N',N'-tetraglycidyl-4, 4'-methylenedianiline), and polyesters, polyamide imide, polyester imide, all compounds, saturated or unsaturated, any mixtures of the compounds mentioned and any combinations and mixtures of the compounds mentioned.

In some embodiments, the electrical operating medium is selected from the group of the following operating media: rotating electrical machines, electrical generators, electric motors, transformers, choke coils, electrical switches and/or bushings.

In some embodiments, the resin component B is selected from the group of the following resins: glycidyl-based and/or epoxy-terminated aryl- and/or alkylsiloxanes, glycidoxy-functionalized, especially glycidoxy-terminated, siloxanes, compounds containing oxirane groups, glycidyl ether siloxane, 1,3-bis(3-glycidyloxypropyl)tetramethyldisiloxane, "DGTMS", glycidoxy-terminated phenyldimethylsiloxane and any desired derivatives thereof, all aforementioned compounds in saturated or unsaturated form and in any combinations and mixtures.

In some embodiments, resin component A and/or resin component B is in the form of a liquid resin and/or solid resin, in the form of at least difunctionalized, e.g., fully polyfunctionalized, monomers and oligomers.

In some embodiments, at least one filler is present, selected from the group of the following fillers: fused silica, ground quartz, talc, alumina, boron nitride, dolomite, and any mixtures and/or combinations of the aforementioned materials.

In some embodiments, the curing agent is in the form of an anhydride.

In some embodiments, the insulation system includes a weave.

In some embodiments, the catalyst is in the form of a cationic or anionic catalyst.

In some embodiments, at least one filler is in multimodal distribution.

As another example, some embodiments include a process for producing a main insulation or parts of a main insulation of an insulation system by encapsulation and/or other automatable application methods for an encapsulating compound to or around an electrical conductor, the encapsulating compound having at least the following components: A) a first resin component A which is carbon-based, B) a second resin component B which is silicon/oxygen-based, where the ratio of the first to the second resin component A:B is in the range between A=99:B=1 to A=60:B=40, i.e. the first resin component is in a predominant amount, C) 0.1% to 10% by weight of catalyst, D) 30% to 85% by weight of dielectric filler, and E) 0-60% by weight of a curing agent.

In some embodiments, the encapsulation is effected via the automatic pressure gelation method.

In some embodiments, the encapsulation or other automatable application method for the encapsulating compound is preceded by at least partial covering of the electrical conductor with a weave.

DETAILED DESCRIPTION

Teachings of the present disclosure include electrical operating media having an insulation system comprising a main insulation or part of a main insulation in the form of an encapsulation by an encapsulating compound, characterized in that the encapsulating compound comprises the following components:

A) a first resin component A which is carbon-based,

B) a second resin component B which is silicon/oxygen-based, where the ratio of the first to the second resin component A:B is in the range between A=99:B=1 to A=60:B=40, i.e. the first resin component is in a predominant amount, C) 0.1% to 10% by weight of catalyst, D) 30% to 85% by weight of dielectric, especially mineral, filler, and E) 0-60% by weight of a curing agent.

Some embodiments include a process for producing a main insulation or parts of a main insulation of an insulation system by encapsulation and/or other automatable application methods for an encapsulating compound to or around an electrical conductor, the encapsulating compound having at least the following components:

A) a first resin component A which is carbon-based,

B) a second resin component B which is silicon/oxygen-based, where the ratio of the first to the second resin component A:B is in the range between A=99:B=1 to A=60:B=40, i.e. the first resin component is in a predominant amount, C) 0.1% to 10% by weight of catalyst, D) 30% to 85% by weight of dielectric filler, and E) 0-60% by weight of a curing agent.

In some embodiments, choosing a suitable filler in combination with a silicon/oxygen-based impregnating resin-which is otherwise customary-allows replacement of the mica tape, i.e., the winding tape insulation still applied by hand to some degree, and hence provision of an insulation system producible by means of an encapsulation for electrical operating media. The production time for such an insulation system can thus be shortened drastically, for example from nowadays about 36 hours to below 6 hours, especially to about 3 hours.

"Insulation system" refers in the present disclosure to an insulation that fundamentally comprises a main insulation, the outer corona shield, terminal corona shield, and optionally the internal potential control. The present disclosure describes a novel formulation for an encapsulating compound for encapsulation for production of the main insulation or parts of the main insulation, which showed, completely surprisingly, in tests that, rather than the customary winding tape insulation, main insulation is producible by simple encapsulation, including in the high-voltage sector.

"Resin-curing agent mixture" in the present disclosure refers to a resin mixture in which there is a curing agent, for example an anhydride curing agent, which accelerates but does not necessarily initiate the polymerization. This is also incorporated into the polymer chain, or the polymer network, in the crosslinking of the monomeric/oligomeric units to give the polymer, i.e., both in the partial gelation and in the full curing of the encapsulating compound. This curing agent component is then detectable in the finished insulation system via spectroscopic methods by which functional groups can be identified in the polymer chain, or polymer network.

It is possible to spectroscopically distinguish between copolymerized epoxy resins that form "ether bridges" in the polymer and conventionally anhydride-cured encapsulating compounds, especially epoxy resins. Copolymerization can be effected via UV curing, and the ether bridges are apparent as C—O vibrations in the IR spectrum. By contrast, conventional anhydride curing, in which a curing agent component is at least partly incorporated into the polymer, into the polymeric backbone, leads to "ester bridges". Here, when—as the name suggests—the curing agent is an anhydride, "ester bridges" are present, which typically exhibit not only C—O vibrations but also C=O vibrations. Spectroscopic detection is possible, for example, by IR spectroscopy, especially Fourier transform infrared spectroscopy.

For the detection of the silicon/oxygen-based resin component, the encapsulation can be chemically separated by high-performance liquid chromatography "HPLC" and analyzed by means of an elemental analysis. The encapsulation—for example in an electrical rotating machine—can optionally be superficially examined by means of ATR-IR spectroscopy. After electrical exposure, the silicon/oxygen-based resin component should be visualizable via a vitrified silicon-rich layer in energy-dispersive elemental analysis or in ESCA analysis.

"Encapsulating compound" in the present disclosure refers to the precursor of a thermoset, which may be in liquid, viscous, partly gelated or cured form. The cured variant corresponds to a thermoset in the insulation system. In the uncured encapsulating compound, referred to as "compound", monomers and oligomers of multiple compounds, especially resin components, are present, and, after the polymerization has been initiated, generally by means of a catalyst, but possibly also by means of curing agents, especially together with light, UV radiation, moisture and/or temperature, these combine to give a long-chain, possibly also branched-chain, polymer network. The polymer network comprises macromolecules having repeat units that are the same. There may be different repeat units present in a polymer network; according to the disclosure, as well as carbon-based repeat units, silicon/oxygen-based repeat units are present, especially in the polymeric backbone.

In addition, for example, there are also uncured, i.e., monomeric or oligomeric, compounds present in the encapsulating compound, which are referred to as "curing agents". These compounds are also incorporated into the polymer chain, or the polymer network, in the course of curing, and hence become a repeat unit or part of a repeat unit.

By contrast, the catalyst serves merely to activate the monomeric or oligomeric compounds present in the storage-stable, liquid resin that is neither gelated or cured, or what is called the encapsulating compound, such that they react with molecules of the same compound or of another compound present in the encapsulating compound for polymerization, i.e., for example, the curing agent or the second resin component A or B, to give the polymer. The catalyst itself generally does not become part of the repeat units that build up to form the polymer network.

The first resin component A is a monomeric or oligomeric resin component functionalized for polymerization which is carbon-based, i.e., comprises one or more ($-CR_2-$) units, with corresponding terminal reactive groups. "R" here represents all kinds of organic radicals that are suitable for curing and/or crosslinking to give an insulating material usable for an insulation system. More particularly, R represents all kinds of radicals that lead to saturated and/or unsaturated compounds; in particular, R may be: "R"=aryl, alkyl, alkoxy-, alkenyl-, alkynyl-, heterocycle-containing radicals, also including nitrogen-, amine-, carboxyl-, oxygen- and/or sulfur-substituted aryls and/or alkyls, and any combinations of two or more of the radicals mentioned in one radical.

More particularly, R may be the same or different and represent the following groups:

alkyl, for example methyl, propyl, isopropyl, butyl, isobutyl, tert-butyl, pentyl, isopentyl, cyclopentyl and all other analogs up to dodecyl, i.e., the homolog having 12 carbon atoms;

alkenyl, for example vinyl, styrene;

aryl, for example: benzyl, benzoyl, biphenyl, tolyl, xylenes etc., especially, for example, all aryl radicals whose structure conforms to Hückel's definition of aromaticity, heterocycles: especially sulfur-containing heterocycles such as thiophenes, tetrahydrothiophene, 1,4-thioxane and homologs and/or derivatives thereof, oxygen-containing heterocycles, for example dioxane, nitrogen-containing heterocycles, for example —CN, —CNO, —CNS, —N3 (azide) etc., sulfur-substituted aryls and/or alkyls: e.g. thiophenes, but also thiols, and radicals of what are called "unsaturated polyester resins" "UP", which can react via one or more double bonds in the molecule to give thermosets.

The Hückel rule for aromatic compounds relates to the association that planar, cyclically-conjugated molecules comprising a number of U electrons that can be represented in the form of 4 n+2 have exceptional stability, which is also described as aromaticity. More particularly, suitable resin component A are, for example, epoxy resins, such as bis-phenol F diglycidyl ether (BFDGE) and/or bisphenol A diglycidyl ether (BADGE), polyurethane and mixtures thereof.

In some embodiments, there are epoxy resins based on bisphenol F diglycidyl ether (BFDGE), bisphenol A diglycidyl ether (BADGE), undistilled and/or distilled, optionally reactively diluted, bisphenol A diglycidyl ether, undistilled and/or distilled, optionally reactively diluted, bisphenol F diglycidyl ether, hydrogenated bisphenol A diglycidyl ether and/or hydrogenated bisphenol F diglycidyl ether, pure and/or solvent-diluted epoxy novolak and/or epoxy-phenol novolak, cycloaliphatic epoxy resins such as 3,4-epoxycy-clohexylmethyl 3,4-epoxycyclohexylcarboxylate, e.g. Araldite CY179, ERL-4221; Celloxide 2021P, a cycloali-phatic epoxy resin suitable for thermal and/or cationic copolymerization, bis(3,4-epoxycyclohexylmethyl) adipate, e.g. ERL-4299; Celloxide 2081, vinylcyclohexene diepox-ide, e.g. ERL-4206; Celloxide 2000, 2-(3,4-epoxycyclo-hexyl-5,5-spiro-3,4-epoxy)-cyclohexane-meta-dioxane, e.g. ERL-4234; diglycidyl hexahydrophthalate, e.g. CY184, EPalloy 5200; tetrahydrophthalic acid diglycidyl ether, e.g. CY192; glycidated amino resins (N,N-diglycidyl-para-gly-cidyloxyaniline, e.g. MY0500, MY0510, N,N-diglycidyl-meta-glycidyloxyaniline, e.g. MY0600, MY0610, N,N,N', N'-tetraglycidyl-4,4'-methylenedianiline), e.g. MY0720, MY721, MY725, and especially also polyesters, polyamide imide, polyester imide, all compounds, saturated or unsatu-rated, any mixtures of the compounds mentioned and any combinations and mixtures of the compounds mentioned. The resins here are known correspondingly by the trade names.

In some embodiments, the second resin component B is also a monomeric or oligomeric resin component function-alized polymerization, which is silicon/oxygen-based, i.e., comprises one or more ($-SiR_2-O-$) units having corre-sponding terminal reactive groups. "R" here represents all kinds of organic radicals that are suitable for curing and/or crosslinking to give an insulating material usable for an insulation system. More particularly, R represents all kinds of radicals that lead to saturated and/or unsaturated com-pounds; in particular, R may be: "R"=aryl, alkyl, alkoxy-, alkenyl-, alkynyl-, heterocycle-containing radicals, also including nitrogen-, amine-, carboxyl-, oxygen- and/or sul-fur-substituted aryls and/or alkyls, and any combinations of two or more of the radicals mentioned in one radical.

In some embodiments, R may be the same or different and represent the following groups:

alkyl, for example methyl, propyl, isopropyl, butyl, isobutyl, tert-butyl, pentyl, isopentyl, cyclopentyl and all other analogs up to dodecyl, i.e. the homolog having 12 carbon atoms;

alkenyl, for example vinyl, styrene;

aryl, for example: benzyl, benzoyl, biphenyl, tolyl, xylenes etc., especially, for example, all aryl radicals whose structure conforms to Hückel's definition of aromaticity, heterocycles: especially sulfur-containing heterocycles such as thiophenes, tetrahydrothiophene, 1,4-thioxane and homologs and/or derivatives thereof, oxygen-containing heterocycles, for example dioxane, nitrogen-containing heterocycles, for example —CN, —CNO, —CNS, —N3 (azide) etc., sulfur-substituted aryls and/or alkyls: e.g. thiophenes, but also thiols, and/or radicals of what are called "unsaturated polyester resins" "UP", which can react via one or more double bonds in the molecule to give thermosets.

In some embodiments, resin component A and/or resin component B is in the form of a liquid resin and/or solid resin, the latter being a resin having a melting point above room temperature, for example novolak, in the form of at least difunctionalized, e.g., polyfunctionalized, monomers, and/or oligomers. For polymerization, the resin component A and B, as stated, are used in the form of mono- or polyfunctionalized monomeric or oligomeric compounds, for example difunctionalized at either end. Suitable nonlimiting examples include amine groups, carboxyl groups, epoxy groups and the like, these being polymerization-functional groups known to the person skilled in the art.

For example, glycidyl-based and/or epoxy-terminated aryl- and/or alkylsiloxanes and/or glycidyl-based and/or epoxy-terminated aryl and/or alkyl hydrocarbons, for example glycidoxy-functionalized, especially glycidoxy-terminated, siloxanes and/or hydrocarbons, e.g. compounds containing oxirane groups, such as glycidyl ethers, are present. In some embodiments, component B is a siloxane, such as 1,3-bis(3-glycidyloxypropyl)tetramethyl-disiloxane, "DGTMS", or glycidoxy-terminated phenyldimethyl-siloxane in monomeric and/or oligomeric form, and in any mixtures and/or any derivatives of the aforementioned compounds in any combinations and/or mixtures. In some embodiments, at least difunctionalized, polyfunctionalized, siloxane monomers, or hydrocarbon monomers usable for production of thermosets are suitable here.

In some embodiments, curing agents, i.e. polymerizable resin components, include, for example, anhydrides, especially acid anhydrides, such as phthalic anhydrides, which have already been used successfully many times in insulation materials. However, the toxicology thereof is not entirely uncontroversial. In some embodiments, the hydrocarbon-based curing agent is also replaced wholly or partly by siloxane-based curing agents having the same functionalities.

In some embodiments, the liquid resin or solid resin also includes additives such as sintering aids, reactive diluents, reactive accelerators and/or further fillers that may be in the form either of nanoparticles or of filler particles in the micrometer range. Examples of suitable "cationic" catalysts, i.e., catalysts that initiate cationic copolymerization, include the so-called superacids that are stronger than 100% sulfuric acid with a pKa of minus 3.

Examples of superacids are:
Inorganic:
    fluorosulfonic acid ($HSO_3F$)
    fluoroantimonic acid ($HSbF_6$)
    tetrafluoroboric acid ($HBF_4$)
    hexafluorophosphoric acid ($HPF_6$)
    trifluoromethylsulfonic acid ($HSO_3CF_3$)
Organic:
    pentacyanocyclopentadiene ($HC_5(CN)_5$)
    partly or wholly fluorinated derivatives of pentaphenyl-cyclopentadiene
    penta(trifluoromethyl)pentadiene or analogous derivatives
    partly or wholly fluorinated derivatives of tetraphenylboric acid or cyano derivatives thereof
    partly or wholly fluorinated derivatives of arylsulfonic acid or cyano derivatives thereof
    partly or wholly fluorinated derivatives of arylphosphonic acid or cyano derivatives thereof
    anions of the carboranes, for example $[C_2B_{10}H_{10}]^{2-}$ or $[C_1B_{11}H_{10}]^-$ Trifluoromethylsulfonic acid ($HSO_3CF_3$) is a particularly suitable representative among these.

The metal salts of superacids can be obtained with many cations, which are, for example but without restriction:
    cations of the alkali metals
    cations of the alkaline earth metals cations of the lanthanoids (rare earths: La, Ce, Pr, Nd, Sm, Eu, Gd, Tb, Dy, Ho, Er, Tm, Yb, Lu, Y)
    cations of the transition metals
    aluminum cations
    cationic metal complexes.

As well as the conventional salts of the alkali metals and alkaline earth metals, the salts of the rare earths and of scandium and aluminum are important in organic synthesis. The triflates have been found to be particularly suitable experimentally, the salts, especially metal salts, of the super-acid trifluoromethanesulfonic acid (TFMS). These take the following general form:

$$(ML_n)^{x+}[O_3S{-}CF_3{}^-]_x$$

M here represents a metal, $L_n$ represents one (n=1) or more (n=2, 3, 4, ligands, and x represents the charge of the metal complex. Suitable cations are thus especially all cations of complex nature or cations without additional ligands.

In some embodiments, catalysts for anionic copolymerization include imidazolium salts and/or amines, such as tertiary amines, pyrazoles and/or imidazole compounds. Nonlimiting examples here include the following compounds: 4,5-dihydroxy-methyl-2-phenylimidazole and/or 2-phenyl-4-methyl-5-hydroxymethylimidazole.

Fillers used in the present disclosure are any dielectric mineral fillers, especially those that show not only electrical insulation but also thermal conductivity. Materials used with preference for the fillers especially include mineral fillers, for example the following: fused silica, ground quartz, talc, also called "soapstone", alumina, boron nitride, dolomite and any mixtures of the aforementioned materials.

In some embodiments, the particle size distribution of the filler fraction(s) is also variable within wide ranges; for example, the average grain diameters are in the range from greater than 100 nm to 1000 μm, especially from 100 nm to 500 μm. In addition, the filler fraction(s) may be present in many forms, e.g., in platelet form, in round form, as rods, and in any mixtures thereof. The filler may be present in one fraction, i.e. in monomodal form, but just as easily in bi- or multimodal form. The filler particles of a filler fraction may be in coated or uncoated form, for example in silanized form.

In some embodiments, in the insulation material comprising the cured base resin, a ratio of $-SiR_2-O$ backbone to $(-CR_2-)$ backbone such as 1:8 to 1:4 is the most favorable, meaning that, in the insulation material in question, the hydrocarbon-based compounds contain 4 to 8 times the amount of the silicon/oxygen-based compounds. The proportions are based on the stoichiometry, i.e. are molar percentages. In some embodiments, the siloxane-containing component is thus present in the base resin of the insulation material, for example, in an amount of 10 to 50 mol %. In some embodiments, the amount of siloxane-containing component in the base resin is not more than 20 mol %, especially not more than 18 mol % and more preferably not more than 15 mol %.

In some embodiments, the partial discharge resistance of the insulation material is increased quite sharply by the presence of a certain amount of silicon/oxygen-based repeat units in the polymeric backbone, i.e. of $-SiR_2-O$-forming monomers and oligomers in the base resin. In some embodiments, a weave, for example a fiber weave, is also added to the encapsulation, which firstly produces thermal expansion or shrinkage of the encapsulation, but also imparts mechanical stability to the only partly gelated resin. The amount of weave can control the thermal expansion of the encapsulation, such that the values can be lowered from high expansion to negligible expansion by addition of the weave.

In some embodiments, the weave includes one or more of: fibers, fiber braids, fiber composites and/or laid scrims, which are especially formed from glass fibers, aramid fibers, ceramic fibers, and/or polymer fibers, for example PET fibers, and from any fiber combinations. A "weave" in the present disclosure refers to a laid scrim, for example with meshes, a braid and/or a fiber composite, where the fabrics mentioned may be present individually or in combination in the weave. A "fiber combination" refers to the situation, for example, when fibers of different materials are present combined in a weave, for example in order to promote a preferential direction.

In some embodiments, a process for producing a main insulation or parts of a main insulation of an insulation system by encapsulation and/or other automatable application methods for an encapsulating compound to and/or around an electrical conductor, the encapsulating compound including at least the following components:

F) a first resin component A which is carbon-based,

G) a second resin component B which is silicon/oxygen-based, where the ratio of the first to the second resin component A:B is in the range between A=99:B=1 to A=60:B=40, especially A=95:B=5 to A=60:B=40, especially A=70:B=30, i.e. the first resin component is in a predominant amount, H) 0.1% to 10% by weight of catalyst, I) 30% to 85% by weight of dielectric filler, and J) 0-60% by weight of a curing agent.

In some embodiments, the production process for producing the main insulation or parts of a main insulation of an insulation system can be conducted without winding, especially without manual winding, of a winding tape. This allows a) compacting of the insulation systems, b) acceleration of the production process and c) the possibility of fully automating the production process. It is possible, for example, to produce an encapsulation or coating in an automated manner.

In some embodiments, what is called the automatic pressure gelation encapsulation method is considered here. In this case, the encapsulating compound is injected into a hot mold into which the conductor bar or conduction-bearing device was initially introduced.

In short residence times, such as below half an hour, the conductor bar or conduction-bearing device has then been encapsulated in that the encapsulating compound is partly gelated and therefore no longer free-flowing. In the present disclosure, "partly gelated" refers to the state in which the encapsulating compound forms a skin on the surface that basically keeps the resin in shape, but beneath which the liquid encapsulating compound is present.

In some embodiments, on completion of encapsulation in the mold during the partial gelation phase, further encapsulating compound is injected into the mold under pressure, for example at 3 to 6 bar, in which case any cavities present can be filled.

In some embodiments, the conductor bar or conduction-bearing device for which a main insulation or parts thereof are being created by means of encapsulation is partly or fully covered by a weave prior to the encapsulation. This can stabilize the encapsulation, accelerate the partial gelation of the encapsulating compound during the process and/or reduce or even entirely prevent thermal expansion or shrinkage of the encapsulating compound on completion of partial gelation and/or curing.

Ground quartz, which is a relatively inexpensive filler, can—as shown by the first tests—replace mica, a planar filler that lengthens the erosion pathway. Together with the increase in electrical erosion resistance which is achieved by the polymerizing incorporation of the silicon/oxygen-based resin component B, it is possible to achieve lifetimes of the insulation system corresponding to those of the currently customary insulation system, with a drastic reduction in insulation thickness.

The insulation thickness of the main insulation of an insulation system of an electrical rotating machine varies according to the application and application method. In the case of encapsulation of a stator winding bar, the thickness of the main insulation is, for example, is between 0.01 cm and 1 cm. The main insulation or parts thereof producible by encapsulation and/or by some other form of automatable application may—according to the application—have various thicknesses, although it is not obligatory for the thickness of the main insulation always to be constant. For example, it may only be 10 mm at the end of the rod in the encapsulation.

In some embodiments, a main insulation or parts of a main insulation of an insulation system of a piece of electrical equipment, such as an electrical rotating machine, does not need a winding tape insulation even in the case of design of the piece of equipment for the high-voltage sector, i.e. above 1 kV. This is achieved by the combination of a proportion of silicon/oxygen-based resin component detectable by elemental analysis in the polymeric thermoset, e.g. of a mineral filler having high dielectric strength.

What is claimed is:

1. An electrical operating medium having an insulation system comprising a main insulation in the form of an encapsulation by an encapsulating compound, wherein the encapsulating compound comprises the following components:

A) a carbon-based resin component A;

B) a silicon/oxygen-based resin component B;

where the ratio of the components A:B is in the range between A=99:B=1 to A=60:B=40;

C) 0.1% to 10% by weight of catalyst;

D) 30% to 85% by weight of dielectric filler; and

E) 0-60% by weight of a curing agent;

wherein the resin component B includes —CR$_2$— units wherein "R" is selected from the group consisting of: alkyl with a homolog having 12 carbon atoms, alkenyl, vinyl, styrene, aryl, oxygen-containing heterocycles, dioxane, nitrogen-containing heterocycles, sulfur-substituted aryls, and alkyls.

2. The electrical operating medium as claimed in claim 1, wherein the resin component A includes at least one —CR$_2$— unit with R comprising at least one substance selected from the group consisting of: aryl, alkyl, alkoxy-, alkenyl-, alkynyl-, heterocycle-containing radicals, also including nitrogen-, amine-, carboxyl-, oxygen-, and sulfur-substituted aryls and/or alkyls and any combinations of two or more of the radicals mentioned in one radical.

3. The electrical operating medium as claimed in claim 1, wherein the resin component A comprises a resin selected from the group consisting of: epoxy resins, bisphenol F diglycidyl ether (BFDGE), bisphenol A diglycidyl ether (BADGE), polyurethane, bisphenol A diglycidyl ether, bisphenol F diglycidyl ether, hydrogenated bisphenol A diglycidyl ether, hydrogenated bisphenol F diglycidyl ether, epoxy novolak, epoxy-phenol novolak, cycloaliphatic epoxy resins, 3,4-epoxycyclohexylmethyl 3,4-epoxycyclohexylcarboxylate; bis(3,4-epoxycyclohexylmethyl) adipate, vinylcyclohexene diepoxide, 2-(3,4-epoxycyclohexyl-5,5-spiro-3,4-epoxy)-cyclohexane-meta-dioxane, diglycidyl hexahydrophthalate, tetrahydrophthalic acid diglycidyl ether; glycidated amino resins (N,N-diglycidyl-para-glycidyloxyaniline, N,N-diglycidyl-meta-glycidyloxyaniline, N,N,N',N'-tetraglycidyl-4,4'-methylenedianiline), polyesters, polyamide imide, and polyester imide.

4. The electrical operating medium as claimed in claim 1, wherein the electrical operating medium comprises a medium selected from the group consisting of: rotating electrical machines, electrical generators, electric motors, transformers, choke coils, electrical switches, and bushings.

5. The electrical operating medium as claimed in claim 1, wherein the resin component B further comprises a resin selected from the group consisting of: glycidyl-based and/or epoxy-terminated aryl- and/or alkylsiloxanes, glycidoxy-functionalized, siloxanes, compounds containing oxirane groups, glycidyl ether siloxane, 1,3-bis(3-glycidyloxypropyl)tetramethyldisiloxane, and glycidoxy-terminated phenyldimethylsiloxane and derivatives thereof.

6. The electrical operating medium as claimed in claim 1, further comprising a filler selected from the group consisting of: fused silica, ground quartz, talc, alumina, boron nitride, and dolomite.

7. The electrical operating medium as claimed in claim 1, wherein the curing agent comprises an anhydride.

8. The electrical operating medium as claimed in claim 1, wherein the insulation system includes a weave.

9. The electrical operating medium as claimed in claim 1, wherein the catalyst comprises a cationic or anionic catalyst.

10. The electrical operating medium as claimed in claim 1, wherein at least one filler is in multimodal distribution.

11. A process for producing an electrical operating medium having an insulation system comprising a main insulation or parts of a in the form of an encapsulation by an encapsulating compound, the process comprising:
   encapsulating an electrical conductor;
   wherein the encapsulating compound includes:
   A) a carbon-based resin component A;
   B) a silicon/oxygen resin component B, wherein a ratio of A:B is in the range between A=99:B=1 to A=60:B=40;
   C) 0.1% to 10% by weight of catalyst;
   D) 30% to 85% by weight of dielectric filler; and
   E) 0-60% by weight of a curing agent
   wherein the resin component B includes —CR$_2$— units wherein "R" is selected from the group consisting of: alkyl with a homolog having 12 carbon atoms, alkenyl, vinyl, styrene, aryl, oxygen-containing heterocycles, dioxane, nitrogen-containing heterocycles, sulfur-substituted aryls and/or alkyls.

12. The process as claimed in claim 11, wherein encapsulating the electrical conductor includes an automatic pressure gelation method.

13. The process as claimed in claim 11, wherein encapsulating the electrical conductor is preceded by at least partial covering of the electrical conductor with a weave.

\* \* \* \* \*